No. 686,632. Patented Nov. 12, 1901.
A. F. McCLATCHEY.
APPARATUS FOR LOCATING METALS, MINERALS, ORES, &c.
(Application filed Dec. 26, 1900.)
(No Model.) 3 Sheets—Sheet 3.

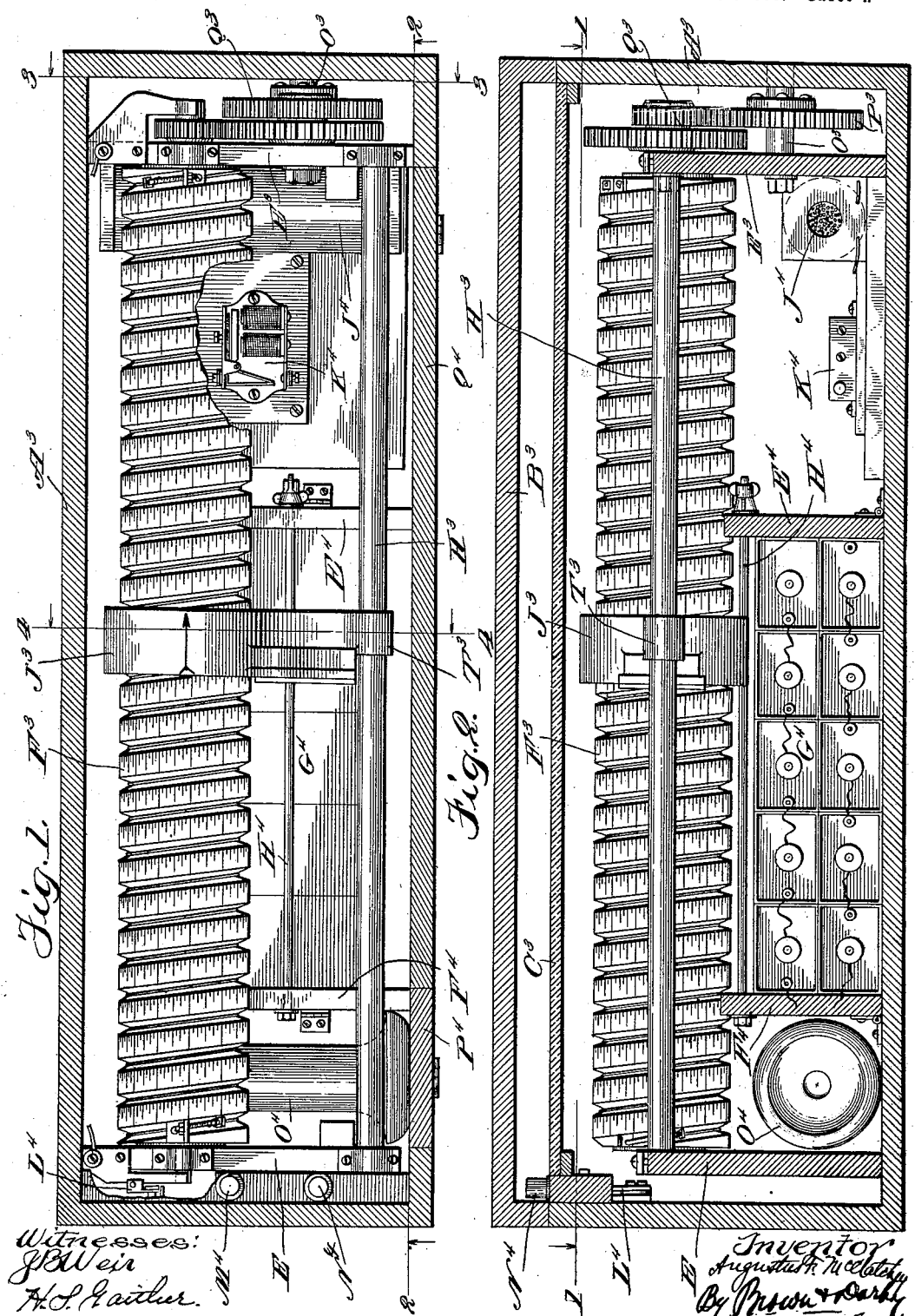

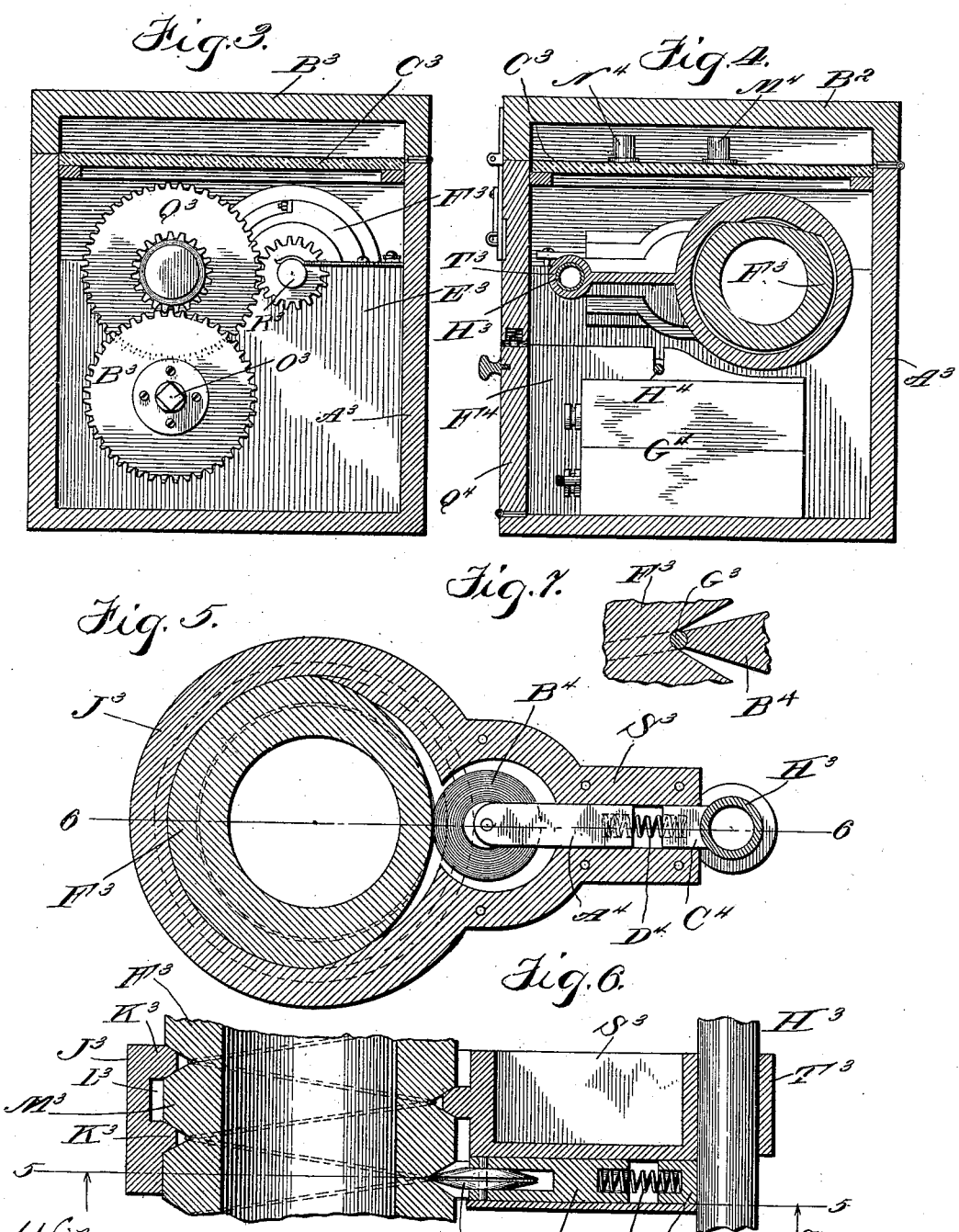

Witnesses:
J. B. Weir
H. S. Gaither

Inventor
Augustus F. McClatchey
By Brown & Darby
Attys

United States Patent Office.

AUGUSTUS F. McCLATCHEY, OF CHICAGO, ILLINOIS, ASSIGNOR TO THE ELECTRIC METAL LOCATING COMPANY, OF CHICAGO, ILLINOIS, A CORPORATION OF ARKANSAS.

APPARATUS FOR LOCATING METALS, MINERALS, ORES, &c.

SPECIFICATION forming part of Letters Patent No. 686,632, dated November 12, 1901.

Application filed December 26, 1900. Serial No. 41,139. (No model.)

*To all whom it may concern:*

Be it known that I, AUGUSTUS F. MC-CLATCHEY, a citizen of the United States, residing at Chicago, in the county of Cook and State of Illinois, have invented a new and useful Apparatus for Locating Metals, Minerals, Ores, and the Like, of which the following is a specification.

This invention relates to apparatus for locating metals, minerals, ores, and the like.

The object of the invention is to provide an apparatus which is simple in construction and arrangement and efficient in operation whereby the presence of ores, minerals, buried treasure, or the like may be detected and the location thereof accurately and quickly determined.

The invention consists, substantially, in the construction, combination, location, and arrangement of parts, all as will be more fully hereinafter set forth, as shown in the accompanying drawings, and finally pointed out in the appended claims.

In Patent No. 645,910, issued March 20, 1900, to Fred H. Brown, is set forth, described, and claimed a method which consists in establishing a circuit of alternating current through a definite distance of the earth and measuring the resistance to such current, then establishing a circuit of similar current through the same distance at various other points in the same vicinity and measuring the resistance to such current, and finally comparing such measurements, and in a pending application of Fred H. Brown, Serial No. 724,183, filed July 17, 1899, is set forth, described, and claimed a construction of apparatus for carrying such process into practical operation. The present invention relates to apparatus of this nature.

Figure 8:
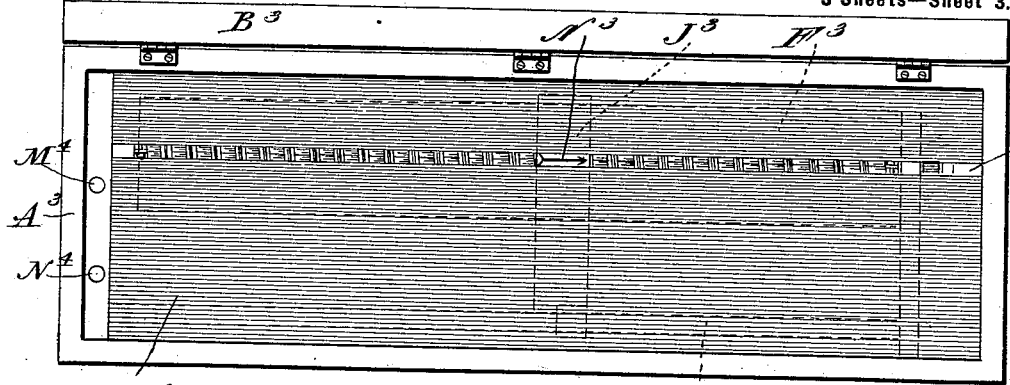
Figure 9:
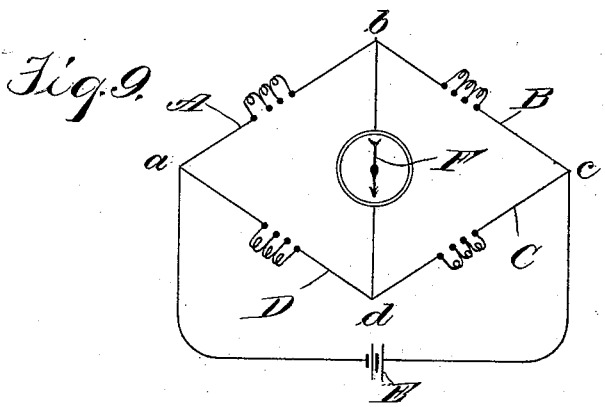
Figure 10:
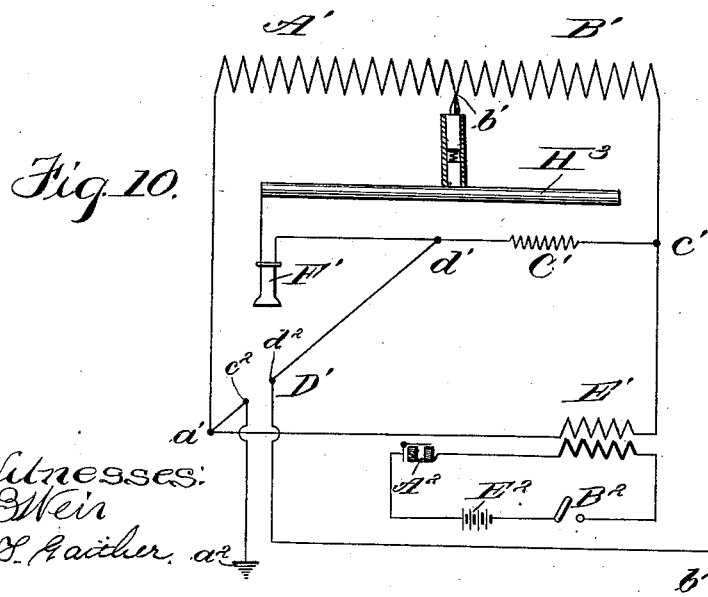

Referring to the accompanying drawings and to the various views and reference-signs appearing thereon, Figure 1 is a view in horizontal section, parts being broken out, on the line 1 1 of Fig. 2 looking in the direction of the arrows and illustrating in plan an apparatus embodying the principles of my invention. Fig. 2 is a view in section on the line 2 2, Fig. 1, looking in the direction of the arrows. Fig. 3 is a vertical transverse section on the line 3 3, Fig. 1, looking in the direction of the arrows. Fig. 4 is a vertical transverse section on the line 4 4, Fig. 1, looking in the direction of the arrows. Fig. 5 is an enlarged detail view in section on the line 5 5, Fig. 6. Fig. 6 is a sectional detail view on the line 6 6, Fig. 5, looking in the direction of the arrows. Fig. 7 is a broken detail view in section, showing the trolley-wheel or contact device and the relation thereof to the conductor carried by the screw. Fig. 8 is a top plan view of an apparatus embodying the principles of my invention. Fig. 9 is a view in diagram of a Wheatstone bridge and is shown for illustrative purposes in connection with the explanation and description of the function, purpose, and mode of operation of my invention. Fig. 10 is a view in diagram illustrating the principles and mode of operation of my invention.

In the practical operation of an apparatus and method as set forth and described in the patent and application referred to terminals are placed in or in contact with the earth a definite and known distance apart, said terminals being included in an electric circuit, the earth between the terminals forming part of such circuit. The resistance of the earth portion of this circuit is then measured. The location of the terminals is then shifted to some other point in the same vicinity and with the terminals spaced substantially the same distance apart as before, and the resistance of the earth between the terminals at the new location is then measured and the operation repeated as often as desired, or so as to cover the desired territory being tested, and these various measurements are then compared with each other. If the resistance so measured at one point varies from that at another point to a material degree, then the presence in the earth of an ore or mineral or other substance at the point where the variation occurs is indicated. If the resistance measured at this point is much less than the average resistance measured in the same vicinity, then it is known that ore, mineral, metal, or the like which is present at the point where there is least resistance possesses the quality of being a better conductor of electricity than the earth. By this system of measurements and comparisons of the resistance of approximately the same fixed, definite, or known distance, as above indicated, the location of the ore or mineral is determined. Now the next step in the operation is to determine the depth of the ore, metal, mineral, or other substance beneath the surface of the earth. This result is accomplished in the apparatus and method referred to by varying the distance or space between the terminals. Thus if ore is located fifty feet below the surface of the earth, then its presence will not be indicated if the measurements of resistance are taken through a distance of one hundred feet or less of the earth—that is, if the terminals are spaced one hundred feet or less apart—for the reason that the current following the well-known law of seeking a path of least resistance will pass directly from one terminal to the other and will not traverse a longer path from one terminal to the ore bed or body and thence back to the other terminal. If, however, the distance of separation of the terminals be increased to two hundred feet or more, then the body of ore, metal, minerals, or the like if of conducting material will offer a path of less resistance to the current as compared with the resistance offered by the same distance of the earth without ore, metal, or minerals. Therefore by thus varying the distance through which the measurements are taken and comparing such measurements the depth of the ore beneath the surface of the earth may be accurately determined.

It will be readily observed that inasmuch as the location of the bed of ore and its depth beneath the surface of the earth are determined by a system of comparative measurements it is not essential that the exact ohmic resistance be absolutely ascertained. Therefore any arbitrary or suitable scale of measurement may be employed, and it is pointed out in the patent and application referred to that the current traversing the circuit in which the earth forms a part is an alternating current in order to avoid inaccuracies or disturbances arising from the effect or presence of earth-currents and also to avoid the objection of polarization at the earth-terminals, which polarization impairs the efficient electrical contact between the terminals and the earth.

My present invention relates to an apparatus such as is above indicated, and before proceeding to a detailed description of the construction, arrangement, and mode of operation of the parts I will first explain the principle of its operation.

Referring to the diagram of Fig. 9, A, B, C, and D represent the four arms of a Wheatstone bridge. $a$, $b$, $c$, and $d$ represent the terminals of said arms, and E a battery the poles of which are respectively connected to the terminals $a c$ of the bridge. Now it is a well-known law that when the resistance in arm A multiplied by the resistance in arm C equals the resistance of arm B multiplied by the resistance of arm D, then a balanced electrical condition is produced in the instrument—that is to say, the current from the battery arriving at the point $a$ has two paths to traverse, one from point $a$ through A, $b$, and B to point C and thence to the other pole of the battery, and the other path from point $a$ through D, $d$, and C to point $c$ and return to battery, and if the resistances of each path are equal half of the current goes by one path and the other half by the other path. Now suppose the points $b d$ are electrically connected and an indicating device arranged in such connection no current will flow through the connection between $b d$ when the paths from the point $a$ to the point $c$ are of equal resistance—that is, when the apparatus is in balanced condition; but suppose the resistance in any one of the arms or sides of the bridge is disturbed—increased or decreased—then the balanced condition is destroyed and the current traversing the arms of the bridge taking the path of least resistance will flow in one direction or the other to the points $b d$, according to the particular arm in which the resistance disturbance occurs, and the amount of resistance will determine the degree of indication of the indicating device. Thus if the indicator is a galvanometer the extent of deflection of the needle will indicate the amount of resistance disturbance interposed or introduced into the arm of the bridge. This principle is availed of in carrying out my invention, as will be seen by reference to the diagram in Fig. 10, wherein A' B' C' D' designate, respectively, the arms of a Wheatstone bridge, corresponding to the arms A B C D of Fig. 9, and $a' b' c' d'$ designate, respectively, the points corresponding to the points $a b c d$ of the diagram shown in Fig. 9, and E' the source of current, and F' the indicating device. Again referring to Fig. 9, it will be seen that the resistance in either the arm A or B may be varied by shifting the point $b$ toward one or the other of the points $a c$. Now suppose the arms A' B' (see Fig. 10) be composed of or include fixed resistances and suppose the side D' of the bridge to include as a portion of the circuit thereof the earth, the earth connections being indicated at $a^2 b^2$. Now if the resistance of B' multiplied by the resistance of D', and which includes the earth portion of the circuit, equals the resistance of A' multiplied by the resistance of C', then no current will pass from the point $b'$ to the point $d'$, and hence the indicating device F' will not be affected. With the earth-terminals $a^2 b^2$ inserted in or contacting with the earth, thereby introducing an earth but fixed resistance, it will be readily seen that by shifting the point $b'$ along an artificial resistance $A'B'$ in one direction or the other a point will be reached where an electrically-balanced condition will eventually be arrived at, and if the point $b'$ moves along a graduated scale the exact point at which the balanced condition is attained can be readily determined for comparison purposes, it not being essential, however, that this point be so accurately determined as to establish absolutely the resistance in the earth portion of the circuit between the points $a^2 b^2$. Now by shifting the earth-terminals $a^2 b^2$ to some other point in the same vicinity and substantially the same distance apart the point $b'$ may be again moved along the resistance $A'B'$ until the same balanced condition is again attained and a reading of the position of the point $b'$ made and compared with the previous reading, and so on throughout as many measurements and comparisons as may be desired or necessary. The indicating device $F'$, as is evident, may be either visual, as in the case of a galvanometer, (indicated at F, Fig. 9,) or may be audible, as, for instance, a telephone-receiver, as indicated at $F'$, Fig. 10. In the same way as above described comparative measurements may be made through varying distances apart of the earth-terminals $a^2 b^2$, and in this manner not only may the locality of mineral-ore or metal beds or the like be determined, but through such measurements and comparisons and the shifting or changing of the distance between the terminals $a^2 b^2$ the distance of the body of ore, mineral, metal, or the like beneath the surface of the earth may be determined. The source of current-supply, (indicated in Fig. 9,) as above stated, is a battery E. This is objectionable, however, in the case diagrammatically illustrated in Fig. 10, for the reason that a direct current traversing the earth between points $a^2 b^2$ may be more or less affected by earth-currents and also may more or less produce polarization at the earth-terminals, thereby rendering the readings or measurements untrustworthy and unreliable by reason of the influence of the earth-currents or of the impaired electrical contact due to the polarization at the earth-terminals. Therefore and in order to avoid these objections use is made of an induction-coil $E'$, the primary circuit of which includes a battery $E^2$ and circuit-interrupter (indicated at $A^2$) and, if desired, a switch, (indicated at $B^2$.) Thus when the switch $B^2$ is closed interrupted currents or impulses traverse the primary circuit of the induction-coil, thereby inducing alternating impulses in the secondary of the induction-coil, the terminals of which secondary induction-coil are connected to points $a' c'$. These interruptions or alternating vibrations produce a buzzing sound in the receiver $F'$ whenever the electric balance of the apparatus is disturbed; but when such balance is restored by shifting the point $b'$ in one direction or the other to include more or less resistance in one or the other of arms $A' B'$ the electrical balance is again restored and no buzzing sound due to the disturbance of the electrical balance is heard in the receiver.

Having now explained the theory and mode of operation of my invention, I will describe a form of mechanical construction, combination, and arrangement embodying the principles of my invention, particular reference being had to Figs. 1 to 8, inclusive, wherein reference-sign $A^3$ designates a suitable box or casing, in which the various working parts are arranged, said box being provided with a hinged cover or top $B^3$. Arranged within the box $A^3$ and suitably supported adjacent to the top and underneath the cover $B^3$ is a glass plate $C^3$, arranged to extend longitudinally of the box and forming an inclosure for the mechanism contained within the box. This glass plate may be covered or frosted the entire surface thereof, if desired, except for a narrow strip or space, (indicated at $D^3$, Fig. 8,) through which is disclosed a strip of the underlying mechanism.

Arranged within the box or casing $A^3$, adjacent to the ends thereof, are bearing plates or supports $E^3$, in which are journaled and suitably supported the ends of a spiral or screw $F^3$, preferably formed hollow and of non-conducting material—such, for instance, as wood. By making said screw hollow lightness is secured without sacrificing anything of strength. The peripheral surface of the screw or of the screw-threads is flattened, and any desired scale or graduation is placed upon such flattened or cylindrical surface, such graduation or scale commencing at one end of the screw and passing spirally around, following the line of the screw-thread and terminating at the opposite end of such screw. Suitably coiled upon the screw and located at the base of the thread-groove therein is wire $G^3$, of high-resistance material and which forms the resistance indicated diagrammatically at $A' B'$ in Fig. 10. By thus arranging the resistance-wire $G^3$ spirally I am enabled to arrange a much greater length thereof than would otherwise be practicable within the limits of the length of the box or casing, thus greatly increasing the range of measurements possible with the apparatus, and it will be observed that by placing this resistance-wire— such, for instance, as German-silver wire— upon the screw $F^3$, which is of insulating material, I provide an efficient insulating-support for such wire, and by arranging such wire at the base or bottom of the grooves forming the screw-threads said wire is arranged out of danger of accidental contact or short-circuiting. Also suitably supported in standards or brackets $E^3$ is a rod $H^3$ of conducting material. If desired and in order to reduce the weight without sacrificing strength, the rod $H^3$ is tubular. Mounted upon to travel along screw $F^3$ is a nut or sleeve $J^3$, having teeth $K^3$ arranged to project into the threads or grooves of the screw, as most clearly indicated in Figs. 5 and 6. The teeth $K^3$, however, are of shorter length than the depth of said groove, thus avoiding possibility of contact between the traveling nut or sleeve $J^3$ and the resistance-wire $G^3$, and the nut is recessed, as at $L^3$, to receive without contact the surface of the teeth $M^3$ of the screw $F^3$, as clearly shown in Fig. 6. The purpose of this construction is to avoid friction and to secure an easy operation or actuation of the nut, and also to avoid danger of disfiguring or rubbing out the graduations placed upon the peripheral flattened surface of the screw-threads. Upon the nut $J^3$ is painted or otherwise produced a pointer or index (indicated at $N^3$) in position to be disclosed through the glass top $C^3$ or the strip $D^3$ thereof. Thus the position of the nut $J^3$ with reference to the graduations of the scale may be readily disclosed to the operator through the glass or other transparent covering $C^3$, thereby enabling the readings of such scale in making measurements and for comparison purposes to be readily and easily effected.

Suitably journaled in the casing is a stud $O^3$, having its end arranged to project through the box or casing at one end thereof and suitably shaped to receive an operating crank-handle or other operating-tool for the purpose of imparting rotation thereto, and upon said stud is mounted a gear-wheel $P^3$, adapted when actuated to impart through any suitable or convenient train of gearing (indicated at $Q^3$) rotation to adjacent spindle-support $R^3$ of screw $F^3$, and the rotation of said stud $O^3$ and of screw $F^3$ effects a travel of nut $J^3$ upon and lengthwise of said screw $F^3$ in one direction or the other, according to the direction of actuation of said screw. The traveling nut $J^3$ is provided with an extension $S^3$, having formed thereon or carrying a sleeve $T^3$, adapted to ride upon and be guided by rod $H^3$. Suitably mounted on extension $S^3$ of the nut $J^3$ is a block $A^4$, in which is journaled a roller or trolley-wheel $B^4$, the peripheral edge of which is arranged to extend into the grooves of the thread of screw $F^3$ and to make electrical contact with the resistance-wire $G^3$, set therein. If desired, and in order to effect an efficient electrical contact as possible between trolley-wheel $B^4$ and the resistance-wire $G^3$, the peripheral surface of said contact wheel or roller may be grooved to conform to the contour of the resistance-wire, as most clearly shown in Fig. 7; but I do not desire my invention to be limited or restricted thereto.

$C^4$ designates a contact-block arranged to make constant contact with rod or bar $H^3$, and, if desired, a spring $D^4$ may be interposed between block $C^4$ and block $A^4$, the tension of said spring being exerted to press upon block $A^4$ and block $C^4$ in opposite directions to maintain efficient electrical contact between the resistance-wire $G^3$ and rod $H^3$.

From the foregoing description it will be seen that the trolley-wheel $B^4$ corresponds in function and operation to the movable point $b'$ of the diagram in Fig. 10, and the rod or bar $H^3$ constitutes a portion of the circuit between the points $b'$ and $d'$ in said diagram. It will also be seen that in the electrical construction above described the connection between the resistance-wire $G^3$ and the bar $H^3$ is maintained throughout any movement of block $J^3$ along or lengthwise of screw $F^3$.

Arranged within the box or casing $A^3$ is an auxiliary casing comprising the side plates $E^4$ $F^4$, said plates being hinged to the base-board of the box or casing, as clearly indicated in Fig. 2. Arranged within this auxiliary casing is a battery $G^4$, which, if desired, may be composed of a number of cells. In practice I have found dry-battery cells particularly well suited and adapted for this purpose, and I have shown ten such cells arranged within the auxiliary casing. The hinged side bars or plates $E^4$ $F^4$ may be held together in any suitable or convenient manner, as by means of a rod $H^4$, which can be readily detached to permit of the insertion or removal of the battery, thus affording a most convenient arrangement for accommodating the battery. This battery corresponds to the battery $E^2$ of the diagram Fig. 10.

$J^4$ designates an induction-coil, which may be of suitable or any ordinary well-known construction.

$K^4$ designates an interrupter or buzzer, which may also be of any well-known suitable or convenient construction. The primary winding of the induction-coil $J^4$ is included in circuit with interrupter $K^4$ and battery $E^2$, one pole of said battery being connected through the interrupter to one terminal of the primary of the induction-coil, the interrupter $K^4$ corresponding to the diagrammatic illustration $A^2$ of Fig. 10, the battery $G^4$ corresponding to the diagrammatic illustration $E^2$, and the induction-coil $J^4$ corresponding to the diagrammatic illustration $E'$. The other terminal of the primary of the induction-coil is connected through any suitable or convenient arrangement of switch, the movable part of which is indicated at $L^4$, Figs. 1 and 2, arranged in convenient position to be actuated to close the circuit of the primary of the induction-coil.

$M^4$ $N^4$ designate the terminals or earth conductors, suitable wires being provided and extending from said terminals and inserted in or contacting with the earth at the desired points, as above explained, the terminals $M^4$ $N^4$ corresponding to the points $c^2$ $d^2$, respectively, of the diagram Fig. 10.

$O^4$ designates a telephone-receiver, one terminal of the circuit of which is in electrical connection in any suitable or convenient manner with rod or bar H³, the other end of which is connected up together with the secondary of the induction-coil J⁴ and the ends of the wire G³ in the manner illustrated in diagram Fig. 10. A convenient place may be provided within the casing to receive the receiver O⁴, a compartment being formed therein, as clearly illustrated, and provided with a hinged door P⁴, by which access may be readily had for the insertion or removal of the receiver. Similarly a hinged door Q⁴ may also be provided to afford ready access to the auxiliary casing or compartment in which the battery is received, as well as to permit of inspection or examination of the interrupter or induction-coil.

From the foregoing description it will be readily seen that I provide an exceedingly simple and efficient apparatus for the process in view; but it is obvious that many variations and changes in the details of construction and arrangement would readily suggest themselves to persons skilled in the art and still fall within the spirit and scope of my invention. I do not desire, therefore, to be limited or restricted to the exact details of construction and arrangement disclosed; but, Having now set forth the object and nature of my invention and a construction embodying the principles thereof, what I claim as new and useful and of my own invention, and desire to secure by Letters Patent of the United States, is—

1. In an apparatus for locating minerals, metals, ores, or other conducting substances in the earth, an induction-coil, a battery and interrupter arranged in the primary of said coil, a Wheatstone bridge arranged in the secondary of such coil, said bridge provided with earth connections, a rotatable screw, a resistance-conductor arranged in the grooves of said screw and forming the artificial resistance of said Wheatstone bridge, a traveling nut mounted on said screw and provided with a contact arranged to operate over said resistance-conductor, said traveling nut being arranged in the bridging-circuit of said bridge, an indicating device also arranged in said bridging-circuit, and means for rotating said screw, as and for the purpose set forth.

2. In an apparatus for locating minerals, metals, ores or other conducting substances in the earth, a Wheatstone bridge provided with earth connections, a source of current-supply, said source of current-supply being connected to said bridge, a rotatable screw, a resistance-conductor arranged in the grooves of said screw and forming the artificial resistance of said bridge, an indicating device arranged in the bridging-circuit of said bridge, a movable contact also arranged in said bridging-circuit and arranged to make contact with said resistance-conductor, a nut mounted to travel upon said screw and carrying said conductor, and means for actuating said conductor, said Wheatstone bridge provided with earth connections, as and for the purpose set forth.

3. In an apparatus for locating minerals, metals, ores or other conducting substances in the earth, an induction-coil, a battery and interrupter arranged in the primary of said coil, a Wheatstone bridge arranged in the secondary of such coil, said bridge provided with earth connections, a conductor-rod arranged to form part of the bridging-circuit of said bridge, a rotatable screw having graduations formed or placed on the peripheral surface thereof, a resistance-conductor seated in the grooves of said screw and forming the artificial resistance of said bridge, a nut mounted to engage the threads of said screw and carrying a contact arranged to bear upon said resistance-conductor, electrical connections between said contact and said rod, and means for rotating said screw, as and for the purpose set forth.

4. In an apparatus for locating minerals, metals, ores or other conducting substances in the earth, the combination of the following elements: an artificial resistance, earth connections, and a source of current-supply in electrical connection with the terminals of said resistance, an indicating device, circuit connections therefor arranged to bridge the circuits connecting said terminals, a movable contact arranged in said bridging-circuit and operating over said artificial resistance, and mechanical devices for moving said movable contact, all arranged and operating in the manner and for the purpose set forth.

5. In an apparatus for locating minerals, metals, ores or other conducting substances in the earth, an induction-coil, a battery and interrupter arranged in the primary of said coil, a Wheatstone bridge arranged in the secondary of such coil, said bridge provided with earth connections, and an artificial resistance, an indicating device and a movable contact arranged in the bridge-circuit of said bridge, and mechanically-actuated devices for moving said contact over said artificial resistance, as and for the purpose set forth.

6. In an apparatus for locating minerals, ores or other conducting substances in the earth, the combination with a source of current-supply, a Wheatstone bridge including an artificial resistance and earth-terminals, an indicating device arranged in the bridging-circuit of said bridge, a movable contact also arranged in said bridging-circuit, a rotatable screw and a traveling nut mounted thereon, said contact being carried by said nut, as and for the purpose set forth.

7. In an apparatus of the class described, a box or casing, an auxiliary receptacle comprising one or more hinged side plates arranged within said box or casing, said auxiliary receptacle adapted to receive a battery, and means for maintaining said hinged plate or plates in position to hold said battery, as and for the purpose set forth.

8. In an apparatus of the class described, a box or casing having a hinged door, an auxiliary receptacle arranged within said box or casing and accessible through such door, said auxiliary receptacle comprising hinged side plates and adapted to receive a battery, and a rod for maintaining said hinged plates in position to retain said battery, as and for the purpose set forth.

In witness whereof I have hereunto set my hand this 22d day of December, 1900, in the presence of the subscribing witnesses.

AUGUSTUS F. McCLATCHEY.

Witnesses:
E. C. SEMPLE,
S. E. DARBY.